Oct. 7, 1969 P. AZZARITI 3,470,603
PROCESS FOR MANUFACTURING BALL PEN POINTS BY EXTRUSION
AND DRAWING STARTING FROM A WIRE
Filed Nov. 28, 1966 4 Sheets-Sheet 3

INVENTOR
PIETRO AZZARITI

BY Young + Thompson
ATTORNEYS

INVENTOR
PIETRO AZZARITI
BY Young + Thompson
ATTORNEYS

United States Patent Office 3,470,603
Patented Oct. 7, 1969

3,470,603
PROCESS FOR MANUFACTURING BALL PEN POINTS BY EXTRUSION AND DRAWING STARTING FROM A WIRE
Pietro Azzariti, Viale Cesare Battisti 85, Desenzano del Garda, Italy
Filed Nov. 28, 1966, Ser. No. 597,315
Claims priority, application Italy, July 8, 1966, 15,906/66
Int. Cl. B29p *11/02*
U.S. Cl. 29—441                         1 Claim

ABSTRACT OF THE DISCLOSURE

Ball pen points are made from wire by shearing off small cylindrical workpieces, compressing the workpiece against an extractor in a die having a cylindrical portion terminating in a truncated conical portion thereby to impart to the workpiece a hollow cylindrical portion at its open end and a hollow truncated conical portion at its closed end, pressing the open end of the workpiece into a bush to form a tang portion on the workpiece to receive an ink-filled tube with the remaining cylindrical portion and the truncated conical portion of the workpiece remaining free, then drawing the closed end of the workpiece in a series of drawing operations with relative reduction of the diameter and increase of the length of the closed end of the workpiece while maintaining said open end of said workpiece in said bush, and thereafter forming a ball seat and inserting and securing a pen ball in the truncated conical end of the workpiece.

---

The present invention relates to a process for manufacturing ball pen points starting from a wire, characterized in that it comprises:

(a) Preliminary shearing operations for cutting a small cylindrical workpiece from a wire.

(b) Successive extrusion operations for transforming the cylindrical workpiece into a cylindrical tube connected to a truncated conical portion.

(c) A succession of operations comprising the initial pressing of the point tang, which is to receive the ink filled tube, and the successive drawing of the free end of the said point, which is to receive the ball, to gradually reduce the diameter thereof while lengthening and shaping it to the final form.

(d) A succession of finishing operations to be performed by a tool and suited to finish the ball seat, form the small ink channels, apply the ball and rim or border the point edges to hold the ball in position with the required free play, whereby the above mentioned operations (a), (b), (c) and (d) may be carried out on the same machine or on different ones, independently from each other.

For a better understanding of the invention the accompanying drawings diagrammatically illustrate the succession of the above mentioned operations according to two different modifications.

Figures 1, 2, 3:
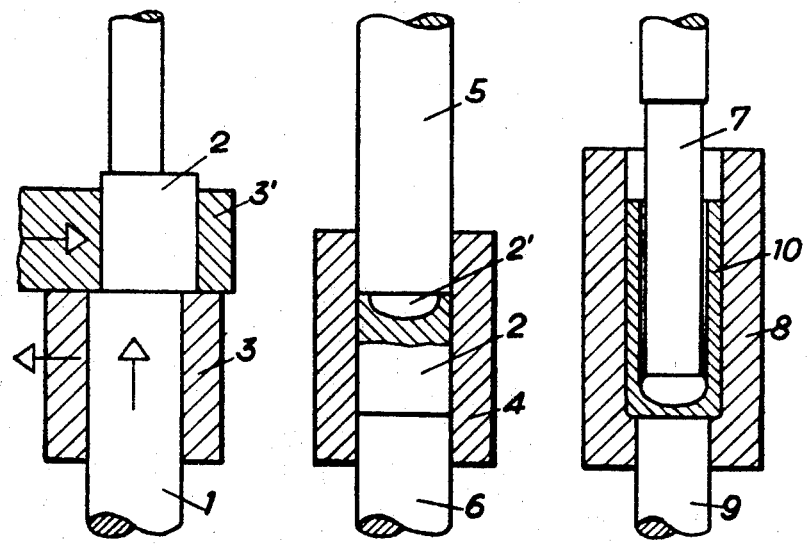
FIGS. 1–18 are representations of the succession of operations according to a first modification.

The first modification takes place as follows: in a non-represented press with automatic conveying means a small cylindrical workpiece 2 is cut from a wire 1 (FIG. 1) of brass, tombac, copper or the like by the relative movement of the two die means 3 and 3' generating a shearing action.

The cylindrical workpiece 2 is then conveyed into the die 4 (FIG. 2), where the punch 5 presses it against the extractor member 6, thereby shaping it into a perfect geometrical form and simultaneously forming the recess 2' which will serve to exactly center the punch 7 at the successive station. At the end of the operation the extractor member 6 pushes the cylindrical workpiece 2 out of the die 4 so that it may be conveyed to the extrusion station of FIG. 3. At this station the punch 7, pushed at high speed against the workpiece 2, operates the extrusion of same, thereby producing a blind bottom tubular element 10. At the successive station (FIG. 5), the tubular element is cut by means of the die 14 and the punch 13, whereby the bottom portion 11' is removed and the so-obtained tubular element 11 passes to the station of FIG. 6 where a blade or knife 16 cuts it to the desired length.

Said tubular element is then conveyed to a second machine with a stepwise rotating or indexing turntable including a plurality of stations where the successive working and finishing operations are carried into effect.

Figures 4, 5, 6:
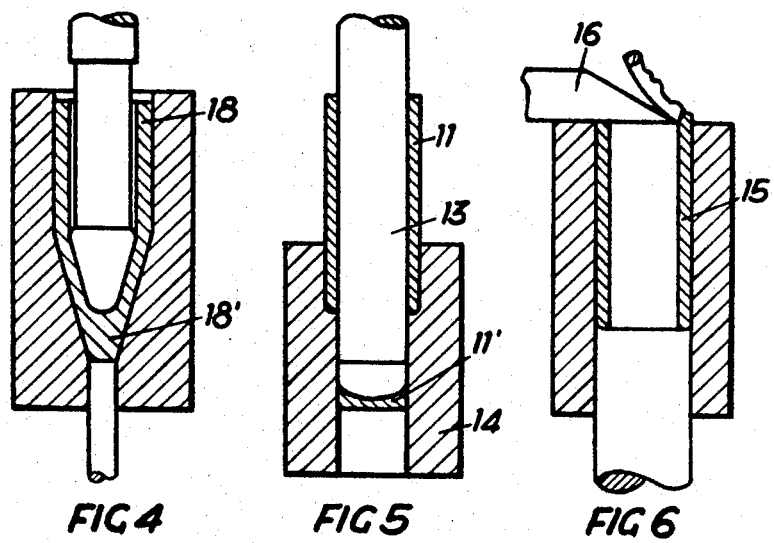

The turntable has bushes 20 (FIGS. 7 to 12) mounted thereon, said bushes being adapted to receive the tubular element 15 of FIG. 6 which is automatically inserted and pressed thereinto and down to the bottom of said bushes in order to be shaped to the final form. The resulting tang portion 15', i.e. that part of the tubular element 15 which is adapted to receive the ink filled tube, is kept in the bush 20 until all the workpiece operations are completed.

Figure 11:
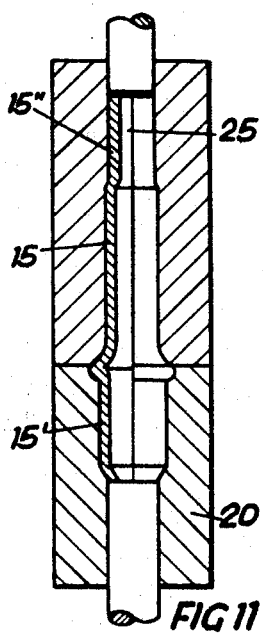
Figure 12:
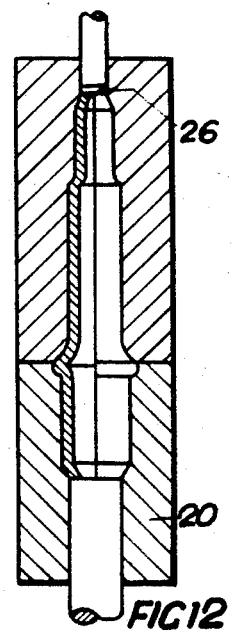

The turntable that the bush 20 is mounted on successively carries the tubular element 15 under the various stations shown in FIGS. 7 to 12 where the free portion 15, adapted to receive the ball, is drawn until it assumes the final form illustrated in FIG. 12.

Figure 7:
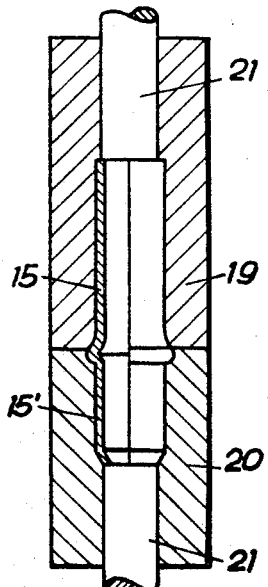

In other words: at the station of FIG. 7 the upper free portion 15 is subjected to a first shaping by means of the die 19. This die, during the indexing movement of the turntable, remains in its highest position so that the tubular element may freely move thereunder. Then it is gradually lowered to finally come into contact with the die 20.

The stationary extractor means 21 keeps the tubular element 15 to the bottom of the bush 20 during the successive upward movement of the die 19.

Figure 8:
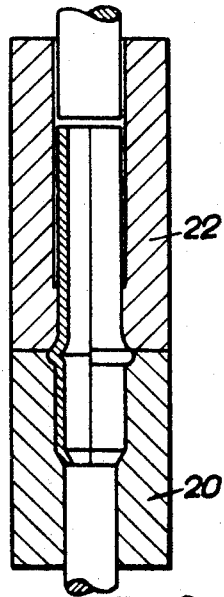
Figure 9:
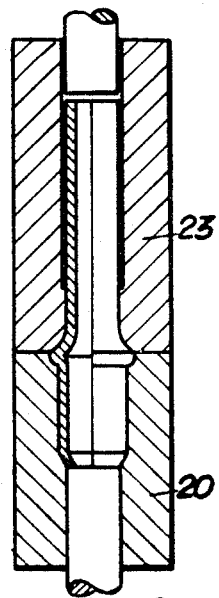
Figure 10:
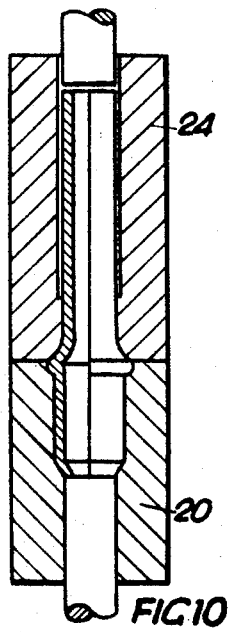

At the station of FIG. 8 the tubular element 15 is subjected to a first reduction of the outer diameter by means of the die 22. With the same system further sectional reductions are progressively effected at the stations of FIGS. 9 and 10.

At the station of FIG. 11, the tubular element which, by this time, has been transformed into a ball pen point, is subjected to an additional reduction of diameter in its upper portion 15″, which is going to receieve the ball. All this has the final aim of providing for a capillary vent or hole 25 adapted to have the ink pass therethrough.

At the station of FIG. 12 the upper end of the tubular element will be shaped into a truncated conical portion 26.

The outside portion of the ball pen point is now completely finished. On the same turntable machine will now be performed a series of machining steps (as illustrated in FIGS. 13 to 15) to prepare the seat for the ball.

Figure 13:
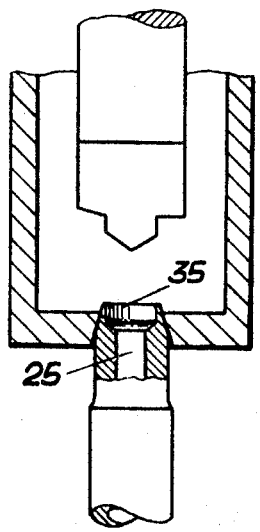

FIG. 13 illustrates the formation of the ball seat 35.

Figure 14:

FIG. 14 shows the drilling and reaming of the capillary hole 36.

Figure 15:

FIG. 15 shows the formation of the small channels 37 for the passage of the ink.

Figure 16:
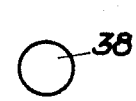
Figure 16:
Figure 17:
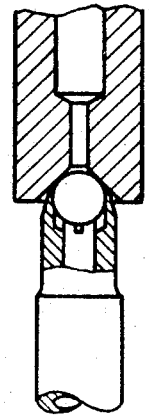
Figure 18:
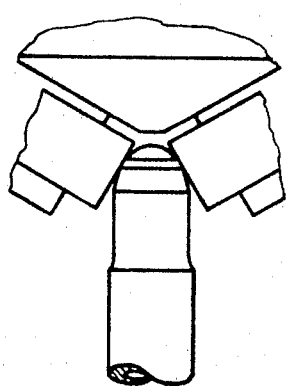
Figure 19:
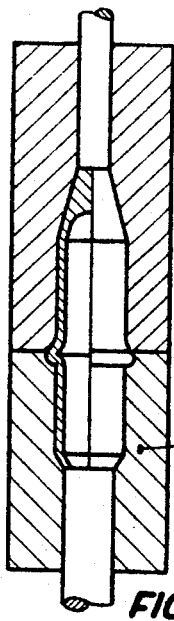
FIGS. 19–22 are representations of a succession of operations needed in a second modification of the process of the invention.
Figure 20:
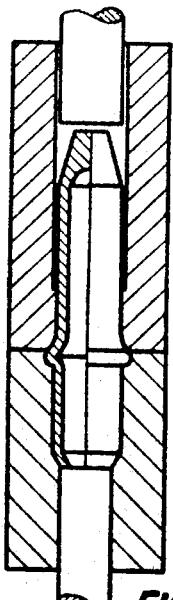
Figure 21:
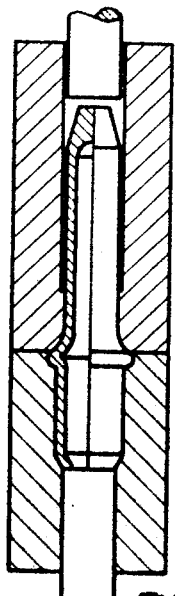
Figure 22:
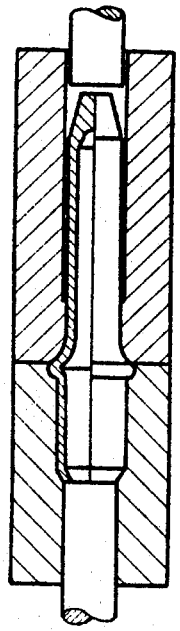

As illustrated in FIG. 16, the ball 38 is then placed in the seat and compressed therein (FIG. 17) to make the seat fit better to said ball, whereafter the ball pen point is rimmed to hold the ball in position with the necessary free play.

After the rimming has been carried out, the point is pushed out of the bush 20 by means of the extractor member 21 (FIG. 7).

The second variant or modification of the above mentioned process includes the operations shown in the FIGS. 1 and 2, followed by the operation illustrated in FIG. 4. By this last named operation the small cylindrical workpiece 2 is embossed or pressed into a cylindrical tubular element 18 connected to a truncated conical portion 18'. The operation of FIG. 4 is then followed by those illustrated in FIGS. 19 to 22 according to which, with the same principle as in FIGS. 7 to 12, the upper free portion of the tubular element is drawn, on a turntable machine, provided with a bush 20, into the required final form. In this case no special punch is necessary to confer a conical form to the upper end of said tubular element.

The ball pen point produced with this system is of better quality since the material in the ball seat region is not subjected to any excessive stress or fatigue in spite of the considerable reduction in section which has been necessary for forming the capillary hole 25.

The shape of the ball seat obtained by drawing is just the same as that which could be achieved by turning.

The operations illustrated in FIGS. 13 to 18 and which have already been described will be carried out after those shown in FIGS. 19 to 22.

What is claimed is:

1. A process for manufacturing ball pen points from wire, comprising shearing off a small cylindrical workpiece from a length of wire, compressing the workpiece against an extractor in a die having a cylindrical portion terminating in a truncated conical portion thereby to impart to the workpiece a hollow cylindrical portion at its open end and a hollow truncated conical portion at its closed end, pressing the open end of the workpiece into a bush to form a tang portion on the workpiece to receive an ink-filled tube with the remaining cylindrical portion and the truncated conical portion of the workpiece remaining free, then drawing the closed end of the workpiece in a series of drawing operations with relative reduction of the diameter and increase of the length of the closed end of the workpiece while maintaining said open end of said workpiece in said bush, and thereafter forming a ball seat and inserting and secure a pen ball in the truncated conical end of the workpiece.

References Cited
UNITED STATES PATENTS

| | | |
|---|---|---|
| 1,877,342 | 9/1932 | Malby. |
| 2,874,460 | 2/1959 | Riethmuller et al. |
| 2,969,030 | 1/1961 | Kahn et al. _____ 113—32 |
| 3,234,772 | 2/1966 | Fehling et al. |

CHARLIE T. MOON, Primary Examiner

U.S. Cl. X.R.

401—212